(12) United States Patent
Son et al.

(10) Patent No.: US 7,964,661 B2
(45) Date of Patent: *Jun. 21, 2011

(54) FLAME RESISTANT THERMOPLASTIC RESIN COMPOSITION HAVING IMPROVED IMPACT RESISTANCE AND CHEMICAL RESISTANCE

(75) Inventors: Se Bum Son, Anyang-si (KR); Sung Hee Ahn, Seoul (KR); In Hwan Oh, Uiwang-si (KR); Sung Duk Hwang, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/538,266

(22) Filed: Aug. 10, 2009

(65) Prior Publication Data

US 2010/0041800 A1 Feb. 18, 2010

(30) Foreign Application Priority Data

Aug. 14, 2008 (KR) ................................. 2008-79753

(51) Int. Cl.
*C08K 3/10* (2006.01)
*C08K 5/00* (2006.01)
(52) U.S. Cl. .......................................... 524/408; 524/81
(58) Field of Classification Search .................... 524/408
See application file for complete search history.

(56) References Cited

U.S. PATENT DOCUMENTS

| | | | |
|---|---|---|---|
| 4,994,515 | A | 2/1991 | Washiyama et al. |
| 5,039,729 | A | 8/1991 | Brackenridge et al. |
| 6,447,913 | B1 | 9/2002 | Wantanabe et al. |
| 2001/0041772 | A1 | 11/2001 | Masubuchi et al. |
| 2005/0137311 | A1 | 6/2005 | Muylem et al. |
| 2008/0088961 | A1 | 4/2008 | Kushida |
| 2008/0160240 | A1 | 7/2008 | Son et al. |
| 2008/0221255 | A1 | 9/2008 | Ahn et al. |
| 2010/0029828 | A1 | 2/2010 | Ahn et al. |
| 2010/0152372 | A1 | 6/2010 | Oh et al. |

FOREIGN PATENT DOCUMENTS

| | | | |
|---|---|---|---|
| JP | 05-295196 | A | 11/1993 |
| JP | 06-322200 | A | 11/1994 |
| JP | 14-97374 | A | 4/2002 |
| JP | 2005272640 | A * | 10/2005 |
| JP | 2006-143955 | | 6/2006 |
| JP | 2007-314619 | | 12/2007 |
| KR | 10-1991-0000910 | A | 1/1991 |
| KR | 910008803 | B1 | 10/1991 |
| WO | 2008/082138 | A1 | 7/2008 |

OTHER PUBLICATIONS

Translation of JP 2005-272640, Oct. 2005.*
International Search Report in commonly owned International Application No. PCT/KR2007/006833 dated Mar. 25, 2008, pp. 1-2.
Suzuhiro Chemica Co., Ltd. Product Info 3-1 (Antimony Trioxide [Fire Cut AT38 AT-3CN AT-3LT AT3CN-LP]) Available Online at: http://www.chemical-suzuhiro.co.jp/EN/pdf/e_product-into[AT3]2.0.pdf, pp. 1-3.
Office Action in commonly owned U.S. Appl. No. 11/965,013, mailed on Jul. 1, 2009, pp. 1-18.
U.S. Patent Office Advisory Action in commonly owned U.S. Appl. No. 11/965,013 dated May 7, 2010, pp. 1-9.
International Preliminary Report on Patentability in commonly owned International Application No. PCT/KR2007/006833 dated Jun. 30, 2009, pp. 1-4.
Office Action in commonly owned U.S. Appl. No. 11/965,013 dated Jan. 28, 2010, pp. 1-17.
Office Action in commonly owned U.S. Appl. No. 12/037,123, mailed on Jan. 25, 2010, pp. 1-11.
Office Action in commonly owned U.S. Appl. No. 12/037,123, mailed on Jun. 29, 2010, pp. 1-10.
U.S. Patent Office Advisory Action in commonly owned U.S. Appl. No. 12/037,123 dated Oct. 18, 2010, pp. 1-3.
Chinese Office Action in counterpart Chinese Application No. 200910166160 dated Nov. 29, 2010, pp. 1-5.
English translation of Chinese Office Action in counterpart Chinese Application No. 200910166160 dated Nov. 29, 2010, pp. 1-6.
Office Action in commonly owned U.S. Appl. No. 12/647,620, mailed on Jan. 31, 2011, pp. 1-10.
Office Action in commonly owned U.S. Appl. No. 12/628,258, mailed on Mar. 24, 2011, pp. 1-22.

* cited by examiner

Primary Examiner — Ling-Siu Choi
Assistant Examiner — Hui Chin
(74) Attorney, Agent, or Firm — Summa, Additon & Ashe, P.A.

(57) ABSTRACT

A flame resistant thermoplastic resin composition having improved impact resistance and chemical resistance is provided. The flame resistant thermoplastic resin composition includes about 100 parts by weight of a base resin; about 3 to about 20 parts by weight of a halogen-containing flame retardant (C); and about 0.1 to about 6 parts by weight of an antimony-containing flame retarding aid (D). The base resin includes about 20 to about 99% by weight of an epoxy group-containing rubber modified aromatic vinyl based resin (A) comprising about 1 to about 99% by weight of an epoxy-containing rubber modified aromatic vinyl based copolymer (A1), about 1 to about 99% by weight of an epoxy-containing vinyl copolymer (A2), and about 0 to about 98% by weight of an aromatic vinyl based copolymer (A3), and about 1 to about 80% by weight of a polyester resin (B).

18 Claims, No Drawings

FLAME RESISTANT THERMOPLASTIC RESIN COMPOSITION HAVING IMPROVED IMPACT RESISTANCE AND CHEMICAL RESISTANCE

CROSS REFERENCE TO RELATED APPLICATIONS

This application claims priority from Korean Patent Application No. 2008-79753, filed Aug. 14, 2008, in the Korean Intellectual Property Office, the disclosure of which is incorporated herein by reference in its entirety.

FIELD OF THE INVENTION

The present invention relates to a flame resistant thermoplastic resin composition having improved impact resistance and chemical resistance.

BACKGROUND OF THE INVENTION

Rubber modified styrene-based resins are widely employed in the production of interior and exterior components for electric and electronic appliances and office automation equipment due to their good workability and mechanical strength.

However, rubber modified styrene-based resins have no resistance against combustion. Further, rubber modified styrene-based resins can actually fuel flames because the resins function as an energy source and promote combustion when a flame is ignited by external ignition factors. For this reason, legal regulations in many countries, including the United States and the European Union, require that resins used in interior and exterior components for electric and electronic appliances meet flame resistance standards. Accordingly, there is on-going research directed to imparting flame resistance to rubber modified styrene-based resins.

A flame retardant, such as a halogen-based flame retardant, a phosphorous-based flame retardant or an inorganic flame retardant, and a flame retarding aid can be added to rubber modified styrene-based resins to impart flame resistance thereto. However, impact resistance deteriorates when a large amount of a flame retardant is added to a rubber modified styrene-based resin to provide flame resistance.

Currently, electric and electronic appliances and office machines are becoming increasingly larger and thinner. When rubber modified styrene-based resins are used in the production of larger thinner products, however, impact resistance and stiffness of the rubber modified styrene-based resins fall short of required levels for such extra-large thin products. Therefore, there is a need to improve the impact strength of such products, for example as determined using a falling ball impact strength test.

Polyester resin generally has a structure with a short molecular chain and is not easily bent. Accordingly, polyester resin has good stiffness, electrical properties, weatherability and heat resistance. Also, the tensile strength of polyester does not significantly deteriorate even when the polyester resin is exposed to a high temperature for a long period of time. In addition, polyester resin has good resistance against oil, such as diesel oil, due to its crystalline nature.

However, the physical properties of polyester resin can change easily when it is brought into contact with an acid or alkali at a high temperature for a long time since the polyester resin has an ester bond. Therefore, polyester resin should be reinforced, for example with glass fiber, when the polyester resin is used as a structural material. Otherwise, it is difficult to use a conventional polyester resin as a structural material formed by injection molding.

Polyester resin can be decomposed at a very fast rate during the combustion thereof. Therefore, it is very difficult to prepare a flame resistant polyester resin. Since it is very difficult to prepare a flame resistant polyester resin from the polyester resin alone, polyester resin comprising reinforcements such as glass fiber is frequently used to provide flame resistance.

Polyester resin has been alloyed with rubber modified styrene-based resin in an attempt to prepare a flame resistant polyester resin. The alloyed resin, however, cannot be used as a structural material due to its significantly deteriorated impact resistance.

SUMMARY OF THE INVENTION

The present inventors have developed a thermoplastic resin with greatly improved impact resistance and chemical resistance by adding both an epoxy-containing rubber modified aromatic vinyl based copolymer and an epoxy-containing vinyl copolymer to a polyester resin. The thermoplastic resin of the invention can provide improved impact resistance and chemical resistance, as well as flame resistance.

According to one aspect of the present invention, there is provided a flame resistant thermoplastic resin composition having improved impact resistance and chemical resistance. The composition comprises about 100 parts by weight of a base resin comprising about 20 to about 99% by weight of an epoxy group-containing rubber modified aromatic vinyl based resin (A) comprising about 1 to about 99% by weight of an epoxy-containing rubber modified aromatic vinyl based copolymer (A1), about 1 to about 99% by weight of an epoxy-containing vinyl copolymer (A2) and about 0 to about 98% by weight of an aromatic vinyl based copolymer (A3), and about 1 to about 80% by weight of a polyester resin (B); about 3 to about 20 parts by weight of a halogen-containing flame retardant (C); and about 0.1 to about 6 parts by weight of an antimony-containing flame retarding aid (D).

In an exemplary embodiment, the epoxy-containing rubber modified aromatic vinyl based copolymer (A1) is a copolymer comprising about 0.02 to about 10 mole % of an unsaturated epoxy based compound (A11) and about 99.98 to about 90 mole % of a rubber modified aromatic vinyl based copolymer (A12).

The rubber modified aromatic vinyl based copolymer (A12) may comprise about 30 to about 80% by weight of rubber. In an exemplary embodiment, the rubber modified aromatic vinyl based copolymer (A12) may have a graft rate of about 35 to about 90%.

The epoxy-containing vinyl copolymer (A2) is a copolymer comprising about 0.02 to about 10 mole % of an unsaturated epoxy based compound (A21) and about 99.98 to about 90 mole % of a vinyl based compound (A22).

In an exemplary embodiment, the vinyl based compound (A22) may comprise about 40 to about 90% by weight of an aromatic vinyl based monomer and about 10 to about 60% by weight of a monomer that is copolymerizable with the aromatic vinyl based monomer.

The monomer that is copolymerizable with the aromatic vinyl based monomer may comprise an unsaturated nitrile based monomer.

The aromatic vinyl based copolymer (A3) may comprise about 0 to about 100% by weight of an aromatic vinyl-based graft copolymer (A31) and about 100 to about 0% by weight of a vinyl based copolymer (A32).

The polyester resin (B) may have an intrinsic viscosity of about 0.3 to about 1.3 g/dL.

The halogen-containing flame retardant (C) may comprise about 40 to about 87% by weight of a halogen.

The antimony-containing flame retarding aid (D) may comprise about 75 to about 87% by weight of antimony.

The resin composition may further comprise additives including a thermal stabilizer, a release agent, a dispersant, an anti-dripping agent, a weather resistant stabilizer, inorganic filler, dyes, and pigments. The additives may be used singly or in the form of combinations of two or more thereof.

In another exemplary embodiment, the resin composition may comprise about 100 parts by weight of the base resin comprising about 55 to about 90% by weight of an epoxy group-containing rubber modified aromatic vinyl based resin (A), and about 10 to about 45% by weight of a polyester resin (B); about 7 to about 20 parts by weight of a halogen-containing flame retardant (C), and about 1 to about 5 parts by weight of an antimony-containing flame retarding aid (D).

In an exemplary embodiment, the resin composition has an Izod impact strength (ASTM D256, ¼" thickness basis) of about 13 kgf cm/cm or more, a falling ball impact strength measured in accordance with ASTM D3763 of about 35 J or more, and a flame retardancy measured in accordance with UL 94 VB of V-0.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Epoxy Group-containing Rubber Modified Aromatic Vinyl Based Resin (A)

The base resin of the resin composition of the invention includes an epoxy group-containing rubber modified aromatic vinyl based resin (A) in the amount of 20 to about 99% by weight. The epoxy group-containing rubber modified aromatic vinyl based resin comprises about 1 to about 99% by weight of an epoxy-containing rubber modified aromatic vinyl based copolymer (A1), about 1 to about 99% by weight of an epoxy-containing vinyl copolymer (A2) and about 0 to about 98% by weight of an aromatic vinyl based copolymer (A3).

In another exemplary embodiment, the epoxy group-containing rubber modified aromatic vinyl based resin (A) may comprise about 5 to about 60% by weight of an epoxy-containing rubber modified aromatic vinyl based copolymer (A1), about 5 to about 65% by weight of an epoxy-containing vinyl copolymer (A2) and about 0 to about 45% by weight of an aromatic vinyl based copolymer (A3).

In another exemplary embodiment, the epoxy group-containing rubber modified aromatic vinyl based resin may comprise about 10 to about 45% by weight of an epoxy-containing rubber modified aromatic vinyl based copolymer (A1), about 10 to about 50% by weight of an epoxy-containing vinyl copolymer (A2) and about 10 to about 60% by weight of an aromatic vinyl based copolymer (A3).

Epoxy-containing Rubber Modified Aromatic Vinyl Based Copolymer (A1) The epoxy-containing rubber modified aromatic vinyl based copolymer (A1) used in the present invention is a resin prepared such that an unsaturated epoxy group is present in a rubber modified aromatic vinyl based copolymer resin by polymerizing about 0.02 to about 10 mole % of an epoxy group-containing unsaturated epoxy based compound (A11) and about 99.98 to about 90 mole % of a rubber modified aromatic vinyl based copolymer (A12).

In the present invention, the epoxy-containing rubber modified aromatic vinyl based copolymer (A1) may be used in the epoxy group-containing rubber modified aromatic vinyl based resin (A) in the amount of about 1 to about 99% by weight, for example about 5 to about 60% by weight, and as another example about 10 to about 45% by weight. When the epoxy-containing rubber modified aromatic vinyl based copolymer (A1) is used in the foregoing amounts, an excellent balance between chemical resistance and impact resistance can be obtained.

Unsaturated Epoxy Based Compound (A1)

The unsaturated epoxy based compound of the present invention may be represented by the following formula 1:

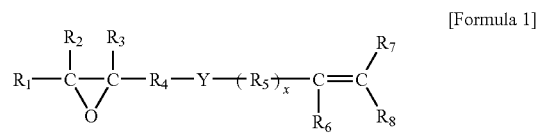

[Formula 1]

wherein each $R_1$, $R_2$, $R_3$, $R_6$, $R_7$ and $R_8$ independently comprises H, saturated or unsaturated C1-C12 alkyl, C6-C14 aryl, saturated C1-C12 alkyl-substituted C6-C14 aryl, or unsaturated C1-C12 alkyl-substituted C6-C14 aryl;

Y is ether (—O—), carboxyl (—O—[C=O]—, —[O=C]—O—), C1-C12 alkylene, C6-C14 arylene, or C1-C12 alkyl-substituted C6-C14 arylene; and x is 0 or 1, wherein if Y is ether (—O—) or carboxyl (—O—[C=O]—, —[O=C]—O—), $R_4$ and $R_5$ independently comprises C1-C12 alkylene group, C6-C14 arylene group or C1-C12 alkyl-substituted C6-C14 arylene, and if Y is C1-C12 alkylene, C6-C14 arylene, or C1-C12 alkyl-substituted C6-C14 arylene, Y is represented by ($R_4$—Y—$R_5$).

Exemplary unsaturated epoxy based compounds include without limitation epoxy alkyl acrylate, allyl glycidyl ester, aryl glycidyl ester, glycidyl methacrylate, glycidyl acrylate, butadiene monoxide, vinyl glycidyl ether, glycidyl itaconate, and the like. The epoxy based compounds may be used singly or in the form of combinations of two or more thereof.

The aforementioned unsaturated epoxy based compound is added in an amount of about 0.02 to about 10 mole %, for example about 0.1 to about 7 mole %, and as another example about 1 to about 5 mole %, in the form of a monomer. In another exemplary embodiment, the unsaturated epoxy based compound may be used in an amount of about 3 to about 7.5 mole %.

If the unsaturated epoxy based compound is added in an amount of less than about 0.02 mole %, the unsaturated epoxy based compound may not sufficiently improve compatibility, and thus impact strength and chemical resistance of the composition may not improve. If the unsaturated epoxy based compound is added in an amount exceeding about 10 mole %, a gelation phenomenon may be generated due to reaction of the unsaturated epoxy based compound during extrusion.

Rubber Modified Aromatic Vinyl Based Copolymer (A12)

The rubber modified aromatic vinyl based copolymer (A12) is a copolymer in which a rubber-like polymer is dispersed and present in the form of particles in a continuous matrix phase comprising an aromatic vinyl based polymer.

The rubber modified aromatic vinyl based copolymer may be polymerized by adding an aromatic vinyl based monomer and, if necessary, a monomer that is copolymerizable with the aromatic vinyl based monomer to the rubber-like polymer.

Exemplary rubber-like polymers include without limitation diene based rubbers, such as polybutadiene, poly(styrene-butadiene), and poly(acrylonitrile-butadiene), saturated rubbers in which hydrogen is added to the diene based rubbers, isoprene rubbers, acryl based rubbers such as polybutyl acrylate, and terpolymer rubbers of ethylene-propylene-diene monomers (EPDM).

The rubber modified aromatic vinyl based copolymer (A12) includes the rubber-like polymer in an amount of about 30 to about 80% by weight based on the total weight of the rubber modified aromatic vinyl based copolymer (A12). If the rubber-like polymer is present in an amount less than about 30% by weight, impact resistance of the resin may be significantly deteriorated since the resin cannot show sufficient elasticity against an external impact. If the rubber-like polymer is present in an amount more than about 80% by weight, the viscosity of the rubber modified aromatic vinyl based copolymer (A12) can rapidly increase during its synthesis and the yield may become poor.

Depending on the impact strength and external appearance of the resin, the average size of the rubber particles can range from about 0.1 to about 4 μm, for example about 0.25 to about 3.5 μm.

The aromatic vinyl based polymer used in a rubber modified aromatic vinyl based copolymer (A12) of the present invention is a polymer of an aromatic vinyl based monomer and a monomer that is copolymerizable with the aromatic vinyl based monomer. Exemplary aromatic vinyl based monomers may include without limitation styrene, α-methyl styrene, β-methyl styrene, p-methyl styrene, para-t-butyl styrene, ethyl styrene, vinyl xylene, monochlorostyrene, dichlorostyrene, dibromostyrene, vinyl naphthalene, and the like. The aforementioned styrene based compounds may be used singly or in the form of combinations thereof.

One or more monomers that are copolymerizable with the aromatic vinyl based monomer may be introduced. Exemplary monomers copolymerizable with the aromatic vinyl based monomers include without limitation unsaturated nitrile based monomers, such as acrylonitrile, methacrylonitrile, ethacrylonitrile, and the like, and combinations thereof.

The part of the rubber modified aromatic vinyl based copolymer (A12) excluding the rubber component may comprise about 40 to about 95% by weight of the aromatic vinyl based monomer.

In an exemplary embodiment, the rubber modified aromatic vinyl based copolymer (A12) may be a styrene-acrylonitrile copolymer. The part of the rubber modified aromatic vinyl based copolymer (A12) excluding the rubber component may comprise about 5 to about 60% by weight, for example about 10 to about 50% by weight, and as another example about 15 to about 40% by weight, acrylonitrile.

The rubber modified aromatic vinyl based copolymer (A12) can have a graft rate of about 35 to about 90%, for example about 50 to about 70%. If the graft rate is less than about 35%, it may be difficult to acquire a white powder with a uniform particle diameter distribution following solidifying and drying steps, and the surface gloss of a molded product may deteriorate in an extrusion or injection process. If the graft rate exceeds about 90%, impact strength of a thermoplastic resin according to the present invention may deteriorate.

Examples of the rubber modified aromatic vinyl based copolymer (A12) may include without limitation acrylonitrile-butadiene-styrene (ABS) copolymer resin, acrylonitrile-acryl rubber-styrene (AAS) copolymer resin, acrylonitrile-ethylenepropylene rubber-styrene (AES) copolymer resin, and the like, and combinations thereof.

The rubber modified aromatic vinyl based copolymer may be produced by bulk polymerization, suspension polymerization, emulsion polymerization, or a combination thereof.

Epoxy-containing Vinyl Copolymer (A2)

The epoxy-containing vinyl copolymer (A2) used in the present invention is a resin prepared such that an unsaturated epoxy group is present in a vinyl based resin by polymerizing about 0.02 to about 10 mole % of an epoxy group-containing unsaturated epoxy based compound (A21) and about 99.98 to about 90 mole % of a vinyl based compound (A22).

In the present invention, the epoxy group-containing rubber modified aromatic vinyl based resin (A) may include the epoxy-containing vinyl copolymer (A2) in an amount of about 1 to about 99% by weight, for example about 5 to about 65% by weight, and as another example about 10 to about 50% by weight. When the epoxy-containing vinyl copolymer (A2) is used in the foregoing amounts, an excellent balance between chemical resistance and impact resistance can be obtained.

Unsaturated Epoxy Based Compound (A21)

The unsaturated epoxy based compound (A21) used in an epoxy-containing vinyl copolymer (A2) of the present invention may be represented by the following formula 1:

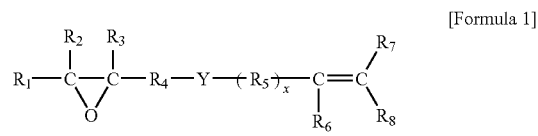

[Formula 1]

wherein each of $R_1$, $R_2$, $R_3$, $R_6$, $R_7$ and $R_8$ independently comprises H, saturated or unsaturated C1-C12 alkyl, C6-C14 aryl, saturated C1-C12 alkyl substituted C6-C14 aryl, or unsaturated C1-C12 alkyl substituted C6-C14 aryl;

Y is ether (—O—), carboxyl (—O—[C=O]—, —[O=C]—O—), C1-C12 alkylene, C6-C14 arylene, or C1-C12 alkyl-substituted C6-C14 arylene; and x is 0 or 1, wherein if Y is an ether (—O—) or carboxyl (—O—[C=O]—, —[O=C]—O—), each $R_4$ and $R_5$ independently comprises C1-C12 alkylene, C6-C14 arylene or C1-C12 alkyl-substituted C6-C14 arylene, and if Y is C1-C12 alkylene, C6-C14 arylene, or Cl-C12 alkyl-substituted C6-C14 arylene, Y is represented by ($R_4$—Y—$R_5$).

Exemplary unsaturated epoxy based compounds include without limitation epoxy alkyl acrylate, allyl glycidyl ester, aryl glycidyl ester, glycidyl methacrylate, glycidyl acrylate, butadiene monoxide, vinyl glycidyl ether, glycidyl itaconate, and the like. The epoxy based compounds may be used singly or in the form of combinations of two or more thereof.

The aforementioned unsaturated epoxy based compound is added in the amount of about 0.02 to about 10 mole %, for example about 0.1 to about 7 mole %, and as another example about 1 to about 5 mole %, in the form of a monomer. In another exemplary embodiment, the unsaturated epoxy based compound may be used in an amount of about 3 to about 7.5 mole %.

The compound is added within the above amounts to thereby obtain excellent impact strength and improve chemical resistance and to thereby prevent a gelation phenomenon during extrusion.

Vinyl Based Compound (A22)

The vinyl based compound comprises an aromatic vinyl based monomer and a monomer that is copolymerizable with the aromatic vinyl based monomer.

Exemplary aromatic vinyl based monomers may include without limitation styrene, α-methyl styrene, β-methyl styrene, p-methyl styrene, para-t-butyl styrene, ethyl styrene, vinyl xylene, monochlorostyrene, dichlorostyrene, dibromostyrene, vinyl naphthalene, and the like. The aforementioned aromatic vinyl based compounds may be used singly or in the form of combinations of two or more thereof.

One or more of monomers that are copolymerizable with the aromatic vinyl based monomer may be introduced. Exemplary monomers that are copolymerizable with the aromatic vinyl based monomer include without limitation unsaturated nitrile based monomers, such as acrylonitrile, methacrylonitrile, ethacrylonitrile, and the like, and combinations thereof.

The ratio of the aromatic vinyl based monomer to the monomer that is copolymerizable with the aromatic vinyl based monomer is determined according to compatibility and the ratio of monomers excluding rubber in components of the rubber modified aromatic vinyl based copolymer (A12). In exemplary embodiments, the vinyl based compound (A22) comprises about 40 to about 90% by weight of the aromatic vinyl based monomer and about 10 to about 60% by weight of the monomer that is copolymerizable with the aromatic vinyl based monomer. In other exemplary embodiments, the vinyl based compound (A22) comprises about 50 to about 80% by weight of the aromatic vinyl based monomer and about 20 to about 50% by weight of the monomer that is copolymerizable with the aromatic vinyl based monomer. If the aromatic vinyl based monomer is present in an amount less than about 40% by weight, the workability of a final product can be reduced because the viscosity can rapidly increase. If the aromatic vinyl based monomer is present in an amount exceeding about 90% by weight, the strength can deteriorate, which is not appropriate for the present invention.

Monomers including acrylic acid, methacrylic acid, maleic anhydride, and N-substituted maleimide may be optionally added to a vinyl based compound (A22) of the present invention, to thereby provide properties such as workability and heat resistance. The monomers for imparting workability and heat resistance may be added in an amount of about 0 to about 30% by weight, for example about 1 to about 20% by weight, and as another example about 2 to about 15% by weight, based on the total weight of the vinyl based compound (A22).

Aromatic Vinyl Based Copolymer (A3)

The aromatic vinyl based copolymer (A3) used in the present invention comprises about 0 to about 100% by weight of an aromatic vinyl based graft copolymer (A31) and about 100 to about 0% by weight of a vinyl based copolymer (A32). In exemplary embodiments, the aromatic vinyl based copolymer (A3) comprises about 5 to about 60% by weight of the aromatic vinyl based graft copolymer (A31) and about 40 to about 95% by weight of the vinyl based copolymer (A32). When the vinyl based copolymer (A32) is present in the foregoing amounts, an excellent balance between melt flow index and impact strength can be obtained.

Aromatic Vinyl-Based Graft Copolymer (A31)

The aromatic vinyl-based graft copolymer (A31) may be produced by graft copolymerizing a rubber-like polymer, an aromatic vinyl based monomer, a monomer that is copolymerizable with the aromatic vinyl based monomer, and optionally, monomers for imparting workability and heat resistance.

Exemplary rubber-like polymers may include without limitation diene based rubbers, such as polybutadiene, poly (styrene-butadiene), and poly(acrylonitrile-butadiene), saturated rubbers in which hydrogen is added to the diene based rubbers, isoprene rubbers, acryl based rubbers such as polybutyl acrylate, and terpolymer rubbers of ethylene-propylene-diene monomers (EPDM).

The aromatic vinyl-based graft copolymer (A31) may include the rubber-like polymer in an amount of about 5 to about 65% by weight, for example about 20 to about 60% by weight, based on the total weight of the aromatic vinyl based graft copolymer (A31). Depending on impact strength and external appearance of the resin, an average size of the rubber particles can range from about 0.1 to about 4 μm.

Exemplary aromatic vinyl based monomers in the graft copolymerizable monomer mixture may include without limitation styrene, α-methyl styrene, β-methyl styrene, p-methyl styrene, para-t-butyl styrene, ethyl styrene, vinyl xylene, monochlorostyrene, dichlorostyrene, dibromostyrene, vinyl naphthalene, and the like. The aromatic vinyl based monomer is graft copolymerized in an amount of about 30 to about 90% by weight, based on the total weight of the aromatic vinyl based graft copolymer (A31).

One or more of monomers that are copolymerizable with the aromatic vinyl based monomer may be introduced into an aromatic vinyl-based graft copolymer (A31) of the present invention. Exemplary monomers that are copolymerizable with the aromatic vinyl based monomers include without limitation unsaturated nitrile based compounds such as acrylonitrile, ethacrylonitrile, methacrylonitrile, and the like, and combinations thereof. The monomers may be used singly or in the form of combinations of two or more thereof. The copolymerizable monomers may be used in an amount of about 1 to about 20% by weight, based on the total weight of the aromatic vinyl based graft copolymer (A31).

Monomers for imparting workability and heat resistance may include without limitation acrylic acid, methacrylate, maleic anhydride, N-substituted maleimide, and the like, and combinations thereof. The monomers for imparting workability and heat resistance can be present in an amount of about 0 to about 15% by weight, based on the total weight of the aromatic vinyl based graft copolymer (A31).

Vinyl Based Copolymer (A32)

The copolymer resin (A32) of the present invention can be produced depending on the compatibility and ratio of monomers excluding rubber in the components of the aromatic vinyl based graft copolymer (A31). The copolymer resin (A32) is obtained by copolymerizing an aromatic vinyl based monomer, a monomer that is copolymerizable with the aromatic vinyl based monomer, and optionally, monomers for imparting workability and heat resistance.

Exemplary aromatic vinyl based monomers may include without limitation styrene, α-methyl styrene, β-methyl styrene, p-methyl styrene, para-t-butyl styrene, ethyl styrene, vinyl xylene, monochlorostyrene, dichlorostyrene, dibromostyrene, vinyl naphthalene, and the like, and combinations thereof. In the present invention, the aromatic vinyl based monomer is used in an amount of about 60 to about 90% by weight, based on the total weight of the vinyl based copolymer (A32) to obtain a copolymer resin.

Exemplary monomers that are copolymerizable with the aromatic vinyl based monomer include without limitation unsaturated nitrile based compounds such as acrylonitrile, ethacrylonitrile, methacrylonitrile, and the like. The monomers may be used singly or in combination of two or more thereof. The monomer that is copolymerizable with the aromatic vinyl based monomer may be used in an amount of about 10 to about 40% by weight, based on the total weight of the vinyl based copolymer (A32).

Exemplary monomers for imparting workability and heat resistance may include without limitation acrylic acid, methacrylate, maleic anhydride, N-substituted maleimide, and the like, and combinations thereof. The monomers for imparting workability and heat resistance can be added during the copolymerization in an amount of about 0 to about 30% by weight, based on the total weight of the vinyl based copolymer (A32).

Polyester Resins (B)

Polyester used in the present invention includes polyester resins with an intrinsic viscosity of about 0.3 to about 1.3 g/dL or copolymers thereof. In exemplary embodiments, polyester resins with an intrinsic viscosity of about 0.5 to about 1.0 g/dL may be used.

The polyester resin can be prepared by polycondensation of aromatic dicarboxylic acid or its ester with diol having 2 to 12 carbon atoms. This polycondensation process is well known in the art and can be readily performed by a person of ordinary skill in the art.

Exemplary aromatic dicarboxylic acids or esters thereof include without limitation terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, dimethyl terephthalate (DMT) which is an aromatic dicarboxylate in which an acid is substituted by a dimethyl group, dimethyl isophthalate, alkyl ester of naphthalene dicarboxylic acids such as dimethyl-1,2-naphthalate, dimethyl-1,5-naphthalate, dimethyl-1,7-naphthalate, dimethyl-1,8-naphthalate, dimethyl-2,3-naphthalate, dimethyl-2,6-naphthalate and dimethyl-2,7-naphthalate, and the like, and combinations thereof.

Exemplary diols having 2 to 12 carbon atoms include without limitation ethylene glycol, 1,2-propylene glycol, 1,3-propylene glycol, 2,2-dimethyl-1,3-propandiol, 2,2-dimethyl-1,3-propylene glycol, 1,3-butandiol, 1,4-butandiol, 1,5-pentandiol, 1,6-hexandiol, 1,3-cyclohexane dimethanol, 1,4-cyclohexane dimethanol, and the like, and combinations thereof.

Inorganic particles may be added to the polyester according to a use of the polyester. Exemplary inorganic particles may include without limitation titanium dioxide ($TiO_2$), silicon dioxide ($SiO_2$), aluminum hydroxide ($Al(OH)_2$), and the like, and combinations thereof. The polyester resin may include the inorganic particles in an amount ranging from about 0.1 to about 30 parts by weight, based on about 100 parts by weight of the polyester resin.

In the present invention, the polyester resin is part of a base resin and is used in the amount of about 1 to about 80% by weight of the base resin. If the polyester resin is used in an amount of less than about 1% by weight, the resin composition may not exhibit the desired impact resistance. If the polyester resin is used in an amount of exceeding about 80% by weight, the overall balance of physical properties can deteriorate. In an exemplary embodiment, the polyester resin (B) may be used in an amount of about 5 to about 50% by weight of the base resin. In another exemplary embodiment, the polyester resin (B) may be used in an amount of about 10 to about 45% by weight of the base resin. In another exemplary embodiment, the polyester resin (B) may be used in an amount of about 20 to about 40% by weight of the base resin.

Halogen-containing Flame Retardant (C)

The halogen-containing flame retardant used in the present invention can be a bromine-containing flame retardant. The halogen-containing flame retardant can include about 40 to about 87% by weight of halogen and can be used in an amount of about 3 to about 20 parts by weight, for example about 5 to about 17 parts by weight, and as another example about 10 to about 15 parts by weight, based on about 100 parts by weight of the base resin of (A) and (B). If the resin composition includes the halogen-containing flame retardant in an amount less than about 3 parts by weight, the resin composition may not exhibit flame retardancy. If the resin composition includes the halogen-containing flame retardant in an amount of exceeding about 20 parts by weight, the physical properties of the resin composition can deteriorate.

Exemplary halogen-containing flame retardants may include without limitation tetrabromo bisphenol A, decabromodiphenyl oxide, decabrominated diphenyl ethane, 1,2-bis(tribromophenyl)ethane, brominated epoxy oligomers with a molecular weight of about 600 to about 8000, octabromotrimethylphenyl indane, tetrabromobisphenol A, bis(2,3-dibromopropyl ether), tris(tribromophenyl)triazine, brominated aliphatic and aromatic hydrocarbons, and the like, and combinations thereof.

Antimony-containing Flame Retarding Aid (D)

The antimony-containing flame retarding aid of the present invention comprises about 75 to about 87% by weight of antimony. Exemplary antimony-containing flame retarding aids include without limitation antimony oxides such as antimony trioxide, antimony pentoxide and the like, and combinations thereof.

The antimony trioxide may have a 50% particle size of about 0.01 to about 6 μm, for example about 0.02 to about 3.0 μm. Excellent dispersibility and mechanical strength can be obtained within the foregoing particle size range.

The antimony pentoxide may have a 50% particle size of about 0.01 to about 1.0 μm, for example about 0.02 to about 0.5 μm. Excellent dispersibility and mechanical strength can be obtained within the foregoing particle size range.

The resin composition includes the flame retarding aid in an amount of about 0.1 to about 6 part by weight, for example about 1 to about 4 parts by weight, based on about 100 parts by weight of the base resin of (A) and (B).

The thermoplastic resin composition according to the present invention may further comprise additives if necessary. Exemplary additives may include without limitation thermal stabilizers, release agents, dispersants, anti-dripping agents, weather resistant stabilizers, inorganic fillers, dyes, pigments, and the like. The additives may be used singly or in the form of combinations of two or more thereof.

The invention may be better understood by reference to the following examples which are intended for the purpose of illustration and are not to be construed as in any way limiting the scope of the present invention, which is defined in the claims appended hereto.

EXAMPLES

The respective components and additives used in the Examples of the present invention and Comparative Examples are as follows:

Epoxy group-containing rubber modified aromatic vinyl based resin (A)

Epoxy-containing aromatic vinyl based copolymer (A1)

Epoxy-containing aromatic vinyl based copolymer (GMA 1 mol %-g-ABS) (A1-1)

A graft copolymer (g-ABS) latex is manufactured by mixing about 100 parts by weight of a composition comprising about 1 mole % of glycidyl methacrylate and about 99 mole % of a g-ABS product of Cheil Industries Inc. as a rubber modified aromatic vinyl based copolymer (A12) (rubber content is about 58% by weight, acrylonitrile content is about 24% by weight based on the parts except the rubber component, and graft rate is about 54 to about 58%), about 150 parts by weight of deionized water based on the about 100 parts by weight of the compound, about 1.0 parts by weight of potassium oleate, about 0.4 parts by weight of cumene hydroperoxide, about 0.2 parts by weight of a mercaptan-based chain transfer agent, about 0.4 parts by weight of glucose, about 0.01 parts by weight of an iron sulfate hydrate, and about 0.3 parts by weight of sodium pyrophosphate based on the total solid contents of the compound; and leaving the combinations at about 75° C. for 5 hours to complete the reaction. A powder state of an epoxy-containing aromatic vinyl based copolymer (GMA g-ABS) is produced by adding about 0.4 parts by weight of sulfuric acid to the graft copolymer (g-ABS) latex based on the solid content of the graft copolymer (g-ABS) latex and solidifying the mixture.

Epoxy-containing Aromatic Vinyl Based Copolymer (GMA 5 mol %-g-ABS) (A1-2)

A graft copolymer (g-ABS) latex is manufactured by mixing about 100 parts by weight of a composition comprising about 5 mole % of glycidyl methacrylate and about 95 mole % of a g-ABS product of Cheil Industries Inc. as a rubber modified aromatic vinyl based copolymer (A12) (rubber content is about 58% by weight, acrylonitrile content is about 24% by weight based on the parts except the rubber component, and graft rate is about 54 to about 58%), about 150 parts by weight of deionized water based on the about 100 parts by weight of the compound, about 1.0 parts by weight of potassium oleate, about 0.4 parts by weight of cumene hydroperoxide, about 0.2 parts by weight of a mercaptan-based chain transfer agent, about 0.4 parts by weight of glucose, about 0.01 parts by weight of an iron sulfate hydrate, and about 0.3 parts by weight of sodium pyrophosphate based on the total solid content of the compound; and leaving the combinations at about 75° C. for 5 hours to complete the reaction. A powder state of an epoxy-containing aromatic vinyl based copolymer (GMA g-ABS) is produced by adding about 0.4 parts by weight of sulfuric acid to the graft copolymer (g-ABS) latex based on the solid content of the graft copolymer (g-ABS) latex and solidifying the mixture.

Epoxy-containing Vinyl Copolymer (A2)

Epoxy-containing Vinyl Copolymer (GMA 1 mol %-SAN) (A2-1)

An epoxy-containing vinyl copolymer (GMA-SAN) is produced by mixing about 100 parts by weight of a monomer mixture comprising about 1% by mole of glycidyl methacrylate and about 99% by mole of a vinyl based compound which comprises about 72% by weight styrene and about 28% by weight acrylonitrile, about 120 parts by weight of deionized water, and additives such as about 0.2 parts by weight of azobisisobutyronitrile, about 0.4 parts by weight of tricalcium phosphate and about 0.2 parts by weight of a mercaptan-based chain transfer agent; heating the mixture from room temperature to about 80° C. for 60 minutes; and leaving the mixture at this temperature for 180 minutes. An epoxy-containing vinyl copolymer (GMA-SAN) in a powder state is produced by washing, dehydrating and drying the epoxy-containing vinyl copolymer.

Epoxy-containing Vinyl Copolymer (GMA 5 mol %-SAN) (A2-2)

An epoxy-containing vinyl copolymer (GMA-SAN) is produced by mixing about 100 parts by weight of a monomer mixture comprising about 5% by mole of glycidyl methacrylate, about 72% by weight styrene and about 28% by weight acrylonitrile, about 120 parts by weight of deionized water, and additives such as about 0.2 parts by weight of azobisisobutyronitrile, about 0.4 parts by weight of tricalcium phosphate and about 0.2 parts by weight of a mercaptan-based chain transfer agent; heating the mixture from room temperature to about 80° C. for 60 minutes; and leaving the mixture at this temperature for 180 minutes. An epoxy-containing vinyl copolymer (GMA-SAN) in a powder state is produced by washing, dehydrating and drying the epoxy-containing vinyl copolymer.

Aromatic Vinyl Based Copolymer (A3)

Aromatic Vinyl Graft Copolymer (A3-1)

A graft copolymer (g-ABS) latex is manufactured by mixing about 50 parts by weight of a solid content of butadiene rubber latex, about 36 parts by weight styrene, about 14 parts by weight acrylonitrile as a graft copolymerizable monomer, about 120 parts by weight of deionized water, about 1.0 parts by weight of potassium oleate, about 0.4 parts by weight of cumene hydroperoxide, about 0.2 parts by weight of a mercaptan-based chain transfer agent, about 0.4 parts by weight of glucose, about 0.01 parts by weight of an iron sulfate hydrate, and about 0.3 parts by weight of sodium pyrophosphate, based on the total solid content of the mixture; and leaving the mixture at about 75° C. for 5 hours to complete the reaction. An aromatic vinyl graft copolymer (g-ABS) in a powder state is produced by adding about 0.4 weight part of sulfuric acid to the resulting graft copolymer (g-ABS) latex based on the total solid content of the graft copolymer (g-ABS) latex resin composition and solidifying the mixture.

Vinyl Based Copolymer (A3-2)

A styrene/acrylonitrile (SAN) copolymer resin is manufactured by mixing about 75 parts by weight styrene, about 25 parts by weight acrylonitrile, about 120 parts by weight of deionized water, and additives such as about 0.2 parts by weight of azobisisobutyronitrile, about 0.4 parts by weight of tricalcium phosphate and about 0.2 parts by weight of a mercaptan-based chain transfer agent; heating the mixture from room temperature to about 80° C. for 90 minutes; and leaving the mixture at this temperature for 180 minutes. A styrene/acrylonitrile (SAN) copolymer resin in a powder state is produced by washing, dehydrating and drying the styrene/acrylonitrile copolymer resin.

Polyester (B)

A product A1100 of Anychem Corporation is used as a polyester resin with an intrinsic viscosity of about 0.76 g/dL.

Halogen-containing Flame Retardants (C)

Decabromodiphenyl oxide (DBDPO) (C1): SAYTEX 102E of Albemarle Corporation (U.S.) is used as DBDPO.

Decabrominated diphenyl ethane (DBDPE) (C2): SAYTEX 4010 of Albemarle Corporation (U.S.) is used as DBDPE.

Tris(tribromophenyl) triazine (C3): FR-245 of ICL Industrial Products is used.

Antimony-containing Flame Retarding Aid (D)

Antimony trioxide (ANTIS-W) of II Sung Antimony Co., Ltd. (R.O.K.) is used.

Examples 1 to 10

After adding the respective foregoing components in the amounts as set forth in the following Table 1, the components are uniformly mixed in a Henschel mixer for 3 to 10 minutes. Pellets are produced by extruding the mixture at a temperature of about 180 to about 280° C., a screw-rotating speed of about 150 to about 300 rpm and a composition feeding rate of about 30 to about 60 kg/hr in an ordinary twin extruder. After drying the produced pellets at about 80° C. for 2 hours, samples for testing physical properties are manufactured by injecting the dried pellets from a 6-Oz injector under conditions including a molding temperature of about 180 to about 280° C. and a mold temperature of about 40 to about 80° C. Physical properties of the samples are measured, and measurement results are represented in the following Table 1. Chemical resistance for Examples 1, 2, 5 and 6 are measured and represented in the following Table 3.

Comparative Examples 1 to 6

Samples are manufactured under the same conditions as the previous Examples except that the samples are manufactured from the respective components as set forth in the following Table 2. Physical properties of the samples are measured and represented in the following Table 2. Chemical resistance for Comparative Examples 1 and 4 are measured and represented in Table 3.

After leaving the manufactured samples of the Examples and Comparative Examples at a temperature of about 23° C. and a relative humidity of about 50% for 48 hours, physical properties of the samples are evaluated by the following methods and represented in Tables 1 to 3.

1) Impact strength: Izod impact strength values (¼– notch, kgf·cm/cm) of samples are measured in accordance with ASTM D256.

2) Falling ball impact strength: Impact absorption energy values up to a point in time at which a first crack is formed on samples are measured by dropping a falling weight having a weight of 3.729 kg and a semispherical weight diameter of 12.5 mm from a height of about 30 cm onto square samples with a thickness of 3.2 mm and a width of 80 mm according to ASTM D3763.

3) Chemical resistance: the degree of crack-formation in the samples is measured using a naked eye judgment standard after applying a strain of 0.6% to 6×6 test samples mounted on a jig that is bent to a predetermined curvature in order to evaluate chemical resistance against an organic solvent.

| A: No crack | B: Fine cracks |
|---|---|
| C: Thick cracks | D: Broken after thick cracks |

4) Flame retardancy: The flame retardancy is measured in accordance with the UL-94 VB evaluation method.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| A | $A_1$-1 | 30 | 15 | — | 30 | — | 30 | 30 | 30 | 5 | 30 |
| | $A_1$-2 | — | — | 30 | — | 30 | — | — | — | — | — |
| | $A_2$-1 | 40 | 40 | 40 | — | — | 20 | 40 | 40 | 40 | 5 |
| | $A_2$-2 | — | — | — | 40 | 40 | — | — | — | — | — |
| | $A_3$-1 | — | 15 | — | — | — | — | — | — | 25 | — |
| | $A_3$-2 | — | — | — | — | — | 20 | — | — | — | 35 |
| B | | 30 | 30 | 30 | 30 | 30 | 30 | 30 | 30 | 30 | 30 |
| C | C1 | 14 | 14 | 14 | 14 | 14 | 14 | — | — | 14 | 14 |
| | C2 | — | — | — | — | — | — | 14 | — | | |
| | C3 | — | — | — | — | — | — | — | 14 | | |
| D | | 2.5 | 2.5 | 2.5 | 2.5 | 2.5 | 2.5 | 2.5 | 2.5 | 2.5 | 2.5 |
| Izod impact strength (¼" kgf·cm/cm) | | 17.8 | 15.9 | 20.3 | 18.5 | 23.2 | 16.7 | 18.8 | 20.3 | 14.7 | 15.3 |
| Falling dart impact strength(J) | | 45 | 40 | 51 | 46 | 58 | 42 | 47 | 51 | 37 | 38 |
| Flame retardancy | | V-0 | V-0 | V-0 | V-0 | V-0 | V-0 | V-0 | V-0 | V-0 | V-0 |

TABLE 2

| | | Comparative Examples | | | | | | | |
|---|---|---|---|---|---|---|---|---|---|
| | | 1 | 2 | 3 | 4 | 5 | 6 | 7 | 8 |
| A | $A_1$-1 | — | — | — | 0.1 | 0.1 | — | 30 | — |
| | $A_1$-2 | — | — | — | — | — | — | — | — |
| | $A_2$-1 | — | — | — | 0.1 | — | 0.1 | — | 40 |
| | $A_2$-2 | — | — | — | — | — | — | — | — |
| | $A_3$-1 | 30 | 30 | 30 | 29.9 | 29.9 | 30 | — | 30 |
| | $A_3$-2 | 40 | 40 | 40 | 39.9 | 40 | 39.9 | 40 | — |
| B | | 30 | 30 | 30 | 30 | 30 | 30 | 30 | 30 |
| C | C1 | 14 | — | — | 14 | 14 | 14 | 14 | 14 |
| | C2 | — | 14 | — | — | — | — | — | — |
| | C3 | — | — | 14 | — | — | — | — | — |
| D | | 2.5 | 2.5 | 2.5 | 2.5 | 2.5 | 2.5 | 2.5 | 2.5 |
| Izod impact strength (¼" kgf·cm/cm) | | 3.5 | 3.8 | 4.1 | 4.0 | 3.6 | 3.5 | 12.2 | 10.5 |
| Falling dart impact strength (J) | | 25 | 27 | 29 | 28 | 25 | 25 | 34 | 32 |

TABLE 3

| Organic Solvent | Examples | | | | Comparative Examples | | |
|---|---|---|---|---|---|---|---|
| | 1 | 2 | 5 | 6 | 1 | 4 | 7 |
| CLEANER | B | B | A | B | C | C | C |
| BRAKE OIL | B | B | B | B | D | D | C |
| SULFURIC AID | B | B | A | B | C | C | C |
| SALAD OIL | B | B | B | B | D | D | C |

From the results of Tables 1, 2 and 3, it can be seen that thermoplastic resin compositions of Examples 1 to 10 in which the epoxy-containing rubber modified aromatic vinyl based copolymer (A1) and the epoxy-containing vinyl copolymer (A2) are included in the specified ranges have excellent impact resistance and chemical resistance as well as flame resistance.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame resistant thermoplastic resin composition having improved impact resistance and chemical resistance, comprising:
    about 100 parts by weight of a base resin, the base resin comprising about 20 to about 99% by weight of an epoxy group-containing rubber modified aromatic vinyl based resin (A) comprising about 1 to about 99% by weight of an epoxy-containing rubber modified aromatic vinyl based copolymer (A1), about 1 to about 99% by weight of an epoxy-containing vinyl copolymer (A2) and about 0 to about 98% by weight of an aromatic vinyl based copolymer (A3), and about 1 to about 80% by weight of a polyester resin (B);
    about 3 to about 20 parts by weight of a halogen-containing flame retardant (C); and
    about 0.1 to about 6 parts by weight of an antimony-containing flame retarding aid (D).

2. The flame resistant thermoplastic resin composition of claim 1, wherein said epoxy-containing rubber modified aromatic vinyl based copolymer (A1) is a copolymer comprising about 0.02 to about 10 mole % of an unsaturated epoxy based compound (A11) and about 99.98 to about 90 mole % of a rubber modified aromatic vinyl based copolymer (A12).

3. The flame resistant thermoplastic resin composition of claim 2, wherein said unsaturated epoxy based compound (A11) is represented by the following formula 1:

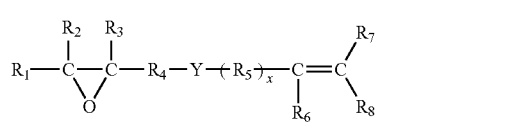

[Formula 1]

wherein each of $R_1$, $R_2$, $R_3$, $R_6$, $R_7$ and $R_8$ independently comprises H, saturated or unsaturated C1-C12 alkyl, C6-C14 aryl, saturated C1-C12 alkyl-substituted C6-C14 aryl, or unsaturated C1-C12 alkyl substituted C6-C14 aryl;

Y is ether (—O—), carboxyl (—O—[C=O], –[O=C]—O—), C1-C12 alkylene, C6-C14 arylene, or C1-C12 alkyl-substituted C6-C14 arylene; and x is 0 or 1, wherein if Y is ether (—O—) or carboxyl (—O—[C=O]—, —[O=C]—O—), $R_4$ and $R_5$ independently comprises C1-C12 alkylene group, C6-C14 arylene group or C1-C12 alkyl-substituted C6-C14 arylene, and if Y is C1-C12 alkylene, C6-C14 arylene, or C1-C12 alkyl-substituted C6-C14 arylene, Y is represented by ($R_4$—Y—$R_5$).

4. The flame resistant thermoplastic resin composition claim 3, wherein said unsaturated epoxy based compound (A11) comprises epoxy alkyl acrylate, allyl glycidyl ester, aryl glycidyl ester, glycidyl methacrylate, glycidyl acrylate, butadiene monoxide, vinyl glycidyl ether, glycidyl itaconate, or a combination thereof.

5. The flame resistant thermoplastic resin composition of claim 2, wherein said rubber modified aromatic vinyl based copolymer (A12) comprises about 30 to about 80% by weight of rubber.

6. The flame resistant thermoplastic resin composition of claim 2, wherein said rubber modified aromatic vinyl based copolymer (A12) has a graft rate of about 35 to about 90%.

7. The flame resistant thermoplastic resin composition of claim 1, wherein said epoxy-containing vinyl copolymer (A2) is a copolymer comprising about 0.02 to about 10 mole % of an unsaturated epoxy based compound (A21) and about 99.98 to about 90 mole % of a vinyl based compound (A22).

8. The flame resistant thermoplastic resin composition of claim 7, wherein said unsaturated epoxy based compound (A21) is represented by the following formula 1:

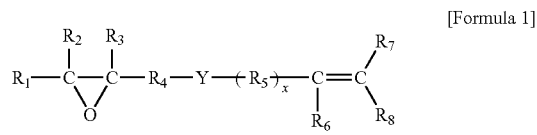

[Formula 1]

wherein each of $R_1$, $R_2$, $R_3$, $R_6$, $R_7$ and $R_8$ independently comprises H, saturated or unsaturated C1-C12 alkyl, C6-C14 aryl, saturated C1-C12 alkyl substituted C6-C14 aryl, or unsaturated C1-C12 alkyl substituted C6-C14 aryl;

Y is ether (—O—), carboxyl (—O—[C=O]—, —[O=C]—O—), C1-C12 alkylene, C6-C14 arylene, or C1-C12 alkyl-substituted C6-C14 arylene; and x is 0 or 1, wherein if Y is an ether (—O—) or carboxyl (—O—[C=O]—, —[O=C]—O—), each $R_4$ and $R_5$ independently comprises C1-C12 alkylene, C6-C14 arylene or C1-C12 alkyl-substituted C6-C14 arylene, and if Y is C1-C12 alkylene, C6-C14 arylene, or C1-C12 alkyl-substituted C6-C14 arylene, Y is represented by ($R_4$-Y-$R_5$).

9. The flame resistant thermoplastic resin composition of claim 7, wherein said unsaturated epoxy based compound (A21) comprises alkyl acrylate, ally glycidyl ester, aryl glycidyl ester, glycidyl methacrylate, glycidyl acrylate, butadiene monoxide, vinyl glycidyl ether, glycidyl itaconate, or a combination thereof.

10. The flame resistant thermoplastic resin composition of claim 7, wherein said vinyl based compound (A22) comprises about 40 to about 90% by weight of an aromatic vinyl based monomer and about 10 to about 60% by weight of a monomer that is copolymerizable with the aromatic vinyl based monomer.

11. The flame resistant thermoplastic resin composition of claim 10, wherein said monomer that is copolymerizable with the aromatic vinyl based monomer comprises unsaturated nitrile based monomer.

12. The flame resistant thermoplastic resin composition of claim 1, wherein said aromatic vinyl based copolymer (A3) comprises about 0 to about 100% by weight of an aromatic vinyl-based graft copolymer (A31) and about 100 to about 0% by weight of a vinyl based copolymer (A32).

13. The flame resistant thermoplastic resin composition of claim 1, wherein said halogen-containing flame retardant (C) comprises about 40 to about 87% by weight of a halogen.

14. The flame resistant thermoplastic resin composition of claim 1, wherein said antimony-containing flame retarding aid (D) comprises about 75 to about 87% by weight of antimony.

15. The flame resistant thermoplastic resin composition of claim 1, wherein said resin composition further comprises one or more additives selected from a thermal stabilizer, a release agent, a dispersant, an anti-dripping agent, a weather resistant stabilizer, an inorganic filler, a dye, a pigment, or a combination thereof.

16. The flame resistant thermoplastic resin composition of claim 1, wherein said resin composition comprises about 100 parts by weight of the base resin comprising about 55 to about 90% by weight of an epoxy group-containing rubber modified aromatic vinyl based resin (A), and about 10 to about 45% by weight of a polyester resin (B); about 7 to about 20 parts by weight of a halogen-containing flame retardant (C), and about 1 to about 5 parts by weight of an antimony-containing flame retarding aid (D).

17. The flame resistant thermoplastic resin composition of claim 1, wherein said resin composition has an Izod impact strength (ASTM D256, ¼" thickness basis) of about 13 kgf cm/cm or more, a falling ball impact strength measured in accordance with ASTM D3763 of about 35 J or more, and a flame retardancy measured in accordance with UL 94 VB of V-0.

18. A molded article prepared from the flame resistant thermoplastic resin composition as defined in claim 1.

* * * * *